Figure 1:
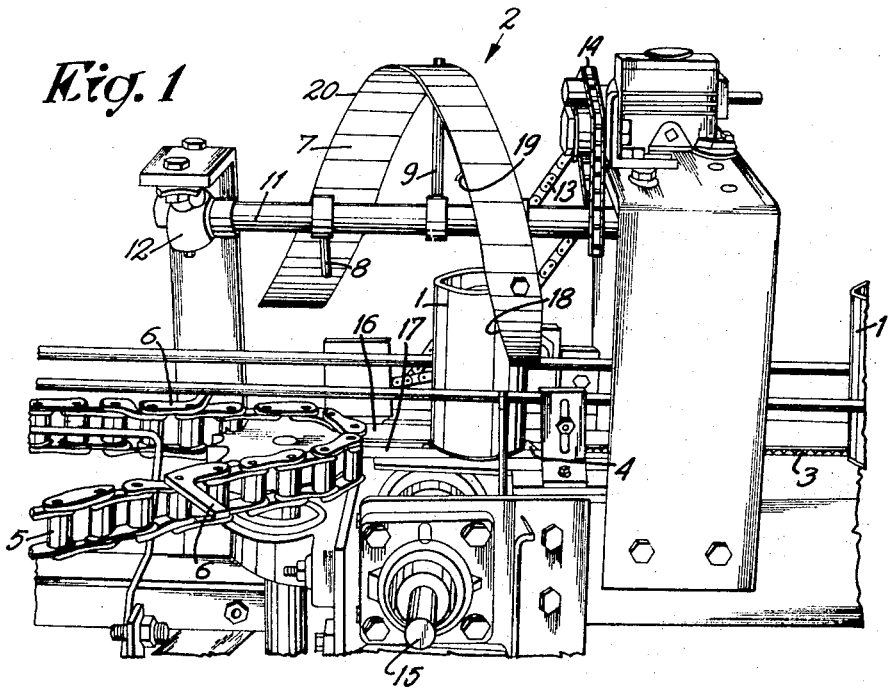
Figure 2:
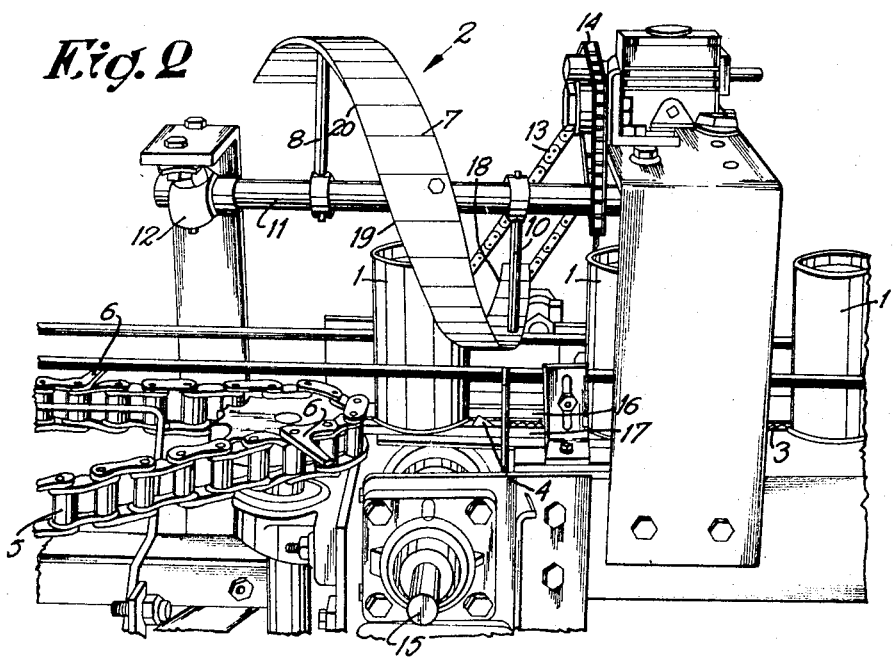

United States Patent

Mansfield

[15] 3,650,374

[45] Mar. 21, 1972

[54] ACCELERATOR FOR CONTAINER CONVEYING EQUIPMENT

[72] Inventor: Tom Mansfield, Wilrijk, Belgium

[73] Assignee: International Machinery Corporation, S.A., St. Niklaas-Waas, Belgium

[22] Filed: Apr. 29, 1970

[21] Appl. No.: 33,020

[30] Foreign Application Priority Data

May 9, 1969 Belgium .................................. 49090

[52] U.S. Cl. .................................. 198/104, 198/25, 198/34
[51] Int. Cl. .................................. B65g 47/31
[58] Field of Search .................. 198/25, 34, 104, 212, 213, 198/214

[56] References Cited

UNITED STATES PATENTS

| 2,854,125 | 9/1958 | Johnson | 198/104 |
| 2,650,694 | 9/1953 | Findlater | 198/104 |
| 3,176,821 | 4/1965 | Eldred et al. | 198/20 |
| 2,952,350 | 9/1960 | Hill | 198/25 |

*Primary Examiner*—Evon C. Blunk
*Assistant Examiner*—Johnny D. Cherry
*Attorney*—Francis W. Anderson

[57] ABSTRACT

An accelerator for containers on container conveying equipment, said accelerator comprising a rotating container engaging cam having a generally helical profile.

5 Claims, 5 Drawing Figures

Patented March 21, 1972 3,650,374

INVENTOR.
TOM MANSFIELD
BY T. W. Anderson
ATTORNEY

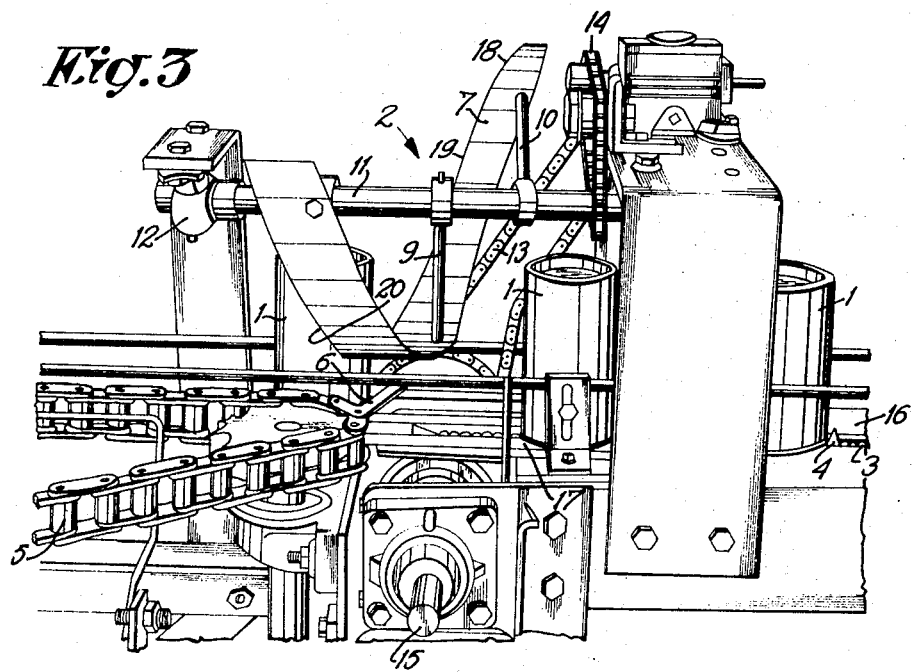
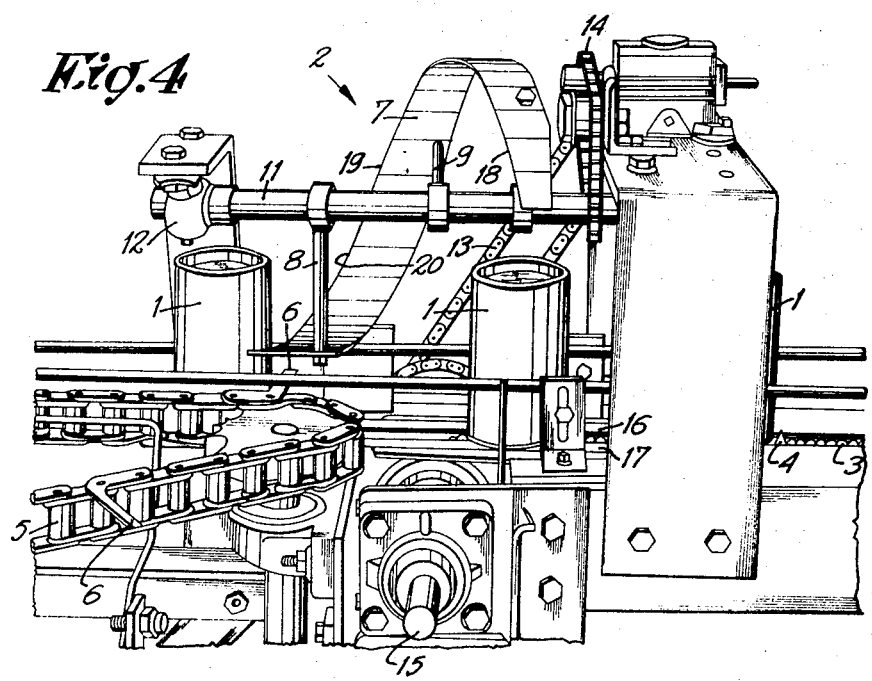

ACCELERATOR FOR CONTAINER CONVEYING EQUIPMENT

It frequently occurs in container handling installations that the space between the containers must be increased, or that the containers must be accelerated.

Such a problem may for instance occur in an installation wherein cans are discharged from a filling machine with a given spacing and must be fed into a closing machine with twice that spacing.

This problem has heretofore been solved by accelerating the cans or containers from their discharge speed to an infeed speed, whereby the ratio of said speeds is equal to that of said spacings. Such acceleration has generally been imparted step by step, usually by means of several chains driven at progressively greater speeds. Such known devices are quite effective but must necessarily be of relatively great length. They are thus cumbersome and relatively expensive.

To obviate this disadvantage, it has also been proposed to use star wheels and cams to accelerate the containers. In many cases, i.e., where open, liquid filled cans are to be accelerated, such a solution is unsatisfactory due to the fact that, regardless of material, shape or size, there is a limit to the rate at which a container containing a liquid or semi-liquid, can be accelerated without spilling. It must be born in mind that the head space in these containers must, in most cases, be kept at its precise, predetermined value.

For these reasons, most accelerators used in the food industry for instance, can handle but 120 to 140 containers per minute. This speed is far below the desired speed of modern closing machines or other equipment, and accordingly such accelerators constitute a serious bottleneck.

It is an object of the present invention to provide a novel type of accelerator which can handle a very large number of cans per minute and satisfactorily accelerate the latter in a minimum distance and time.

Another object of the invention is to provide such an accelerator which will be sturdy, trouble free, long lasting and relatively inexpensive to manufacture and operate.

These objects are attained, according to this invention, by an accelerator for containers, comprising a positively driven cam member and means to feed cans at a given velocity to said cam member, at least part of said cam member having a non-linear generally helical cam profile.

More particularly, such an accelerator may comprise a rotatively driven generally helical cam located between and above an infeed device, driven at a given velocity, and a takeoff device, driven at a higher velocity said cam successively contacting, as it rotates, the containers carried by said infeed device and accelerating them to the velocity of said takeoff device.

In a preferred embodiment, said cam, which is timed with the infeed device, is given a profile consisting of three sections. This profile, when developed into a plane, shows a first section or ramp, a curved section derived from a polynomial equation and a third, straight section.

The first section adds a constant velocity to the velocity of the contacted container at which it is fed by said infeed device, whilst the second section accelerates the container to the velocity of the takeoff device, the third straight section further driving the container at said latter velocity.

In fact, said first and second sections constitute a portion of a complete polydyne cam which, as known, combines the polynomial equation with the dynamics of a follower system.

Besides accelerating the containers, said first and second sections play another important function, the first section creates a slight shock to the containers so as to minimize the building up of a wave in the liquid contained therein, whilst the shape of the second section counteracts the formation of a shock wave. Therefore, no spillage occurs.

Figure 5:
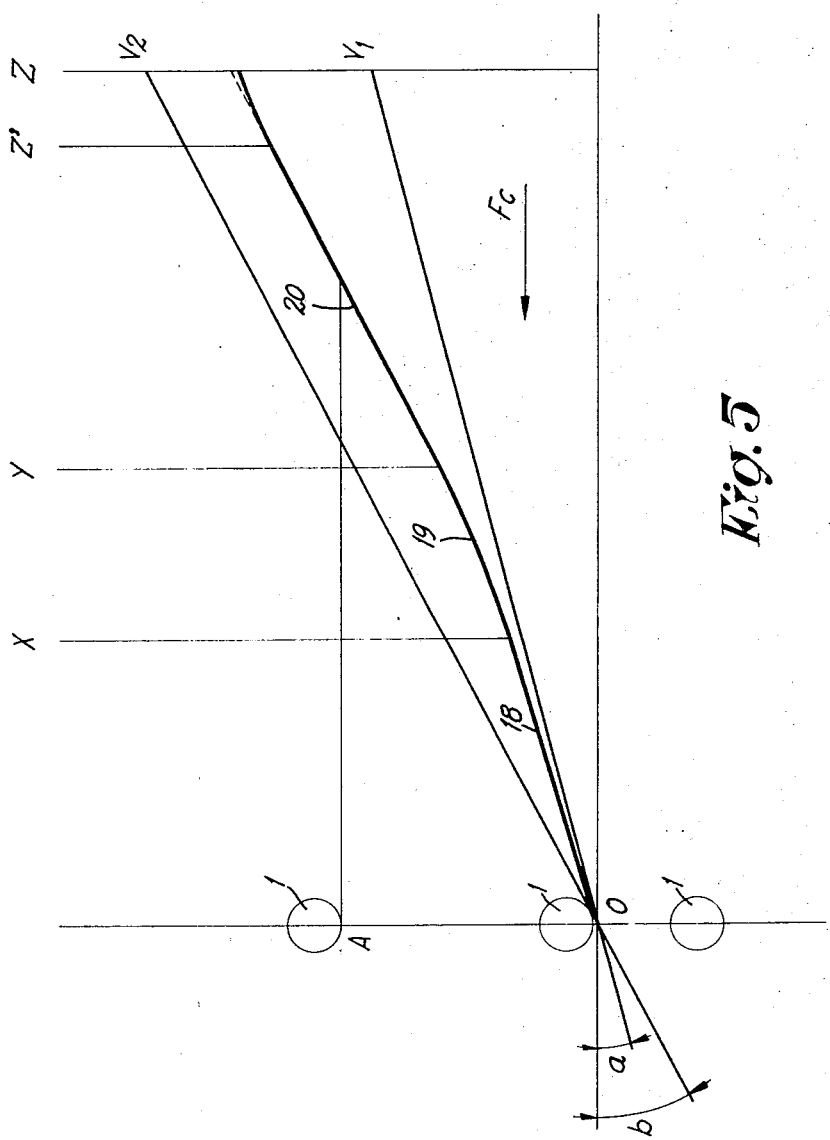

These and other characteristics and advantages will become more apparent from the exemplative description of one practical embodiment of the invention given hereunder with reference to the accompanying drawings, wherein:

FIGS. 1 to 4 are perspective front views of an accelerator according to the invention, respectively in four characteristic positions, and FIG. 5 is a diagram illustrating the rate of acceleration between initial and final velocity of the containers, as well as the shape of the cam profile of the accelerator shown in FIGS. 1 to 4.

In the illustrated embodiment, open cans 1 are fed to the accelerator 2 by an infeed chain 3 having fingers 4 and are discharged by a chain 5 having fingers 6.

The accelerator 2 comprises a helically wound cam member 7 fixed by means of brackets 8, 9 and 10 to a shaft 11; the latter is freely supported in bearings 12 (of which one only is shown) and rotatably driven by means of a chain drive 13, 14, from the drive shaft 15 of chain 3.

The cans 1 slide alongst two guide rails 16 and 17. As best shown in FIG. 5, the active edge of cam-member 7 is given a profile showing three successive sections, respectively 18, 19 and 20, said sections extending between points O,X ; X,Y and Y,Z respectively.

In the diagram of FIG. 5, distances are given in ordinate and time in abscisses. The initial velocity of the cans is indicated by $V_1$ (angle $a$) and the final velocity by $V_2$ (angle $b$). The infeed chain 3 leaves cans off at point 0, whilst the fingers 6 of takeoff chain 5 contact the cans as off point A. The first section 18 consists of a so called ramp which is a straight line or a constant velocity added to $V_1$. The second section 19, between points X and Y has been calculated from a polynomial equation which provides for a specific type and rate of acceleration. The distance between O and Y of the profile is a portion of a complete generally helical cam. Point Y is located at the point where the curve X-Y is parallel with $V_2$. The third section 20 is a straight line, parallel with $V_2$. Preferably, said section is made to slightly taper off near point Z, from point Z'.

A can 1 fed by chain 3 at speed $V_1$ is picked up by section 18 (point 0 of FIG. 5 wherein $F_c$ indicates the direction of travel of the cans. This ramp 18 creates a slight shock to the can so that further build up of a wave in the liquid contained therein is minimized. The considered can is further accelerated until it reaches, at the end of section 19, the speed $V_2$. The shape of section 19 is such as to counteract any formation of a shock wave in said liquid. Section 20 further drives said can at speed $V_2$, whilst a finger 6 of the takeoff chain 5 contacts said can to further drive the latter at the same, constant speed.

In a test unit, built in conformity of the appended drawings cans spaced 140 mm. were accelerated to a spacement of 280 mm. in a distance of approximately 150 mm. only. This unit successfully handled up to 250 cans a minute, without any spillage.

Of course, several modifications may be brought to the device hereabove described, without departing from the scope of the present invention. Although no tests were run to that effect, it is even possible that the teachings of the invention could be applied to decelerate cans.

What I claim is:

1. An apparatus for gently changing the speed of containers comprising a first conveyor for moving containers at a first predetermined speed along a common linear path; a second conveyor for moving the containers along said path at a second predetermined speed; and a driven generally helical speed changing cam having an uninterrupted container contacting camming surface passing generally transversely through said path; said camming surface having a low pitch portion disposed adjacent to said first conveyor and angled relative to said path so that its point of contact with a container moves in the same direction and at substantially the same speed as said first conveyor, said camming surface having a high pitch portion disposed adjacent to said second conveyor and angled relative to said path so that its point of contact with the container moves in the same direction and at substantially the same speed as said second conveyor, said camming surface having a speed changing portion disposed between said low pitch and high pitch portions for gently varying the speed of the containers between first speed and said second speed.

2. An apparatus according to claim 1 wherein said generally helical cam extends through an arcuate extent of less than 360°.

3. An apparatus according to claim 1 wherein said generally helical cam is mounted on and fixed to a shaft that extends above and parallel to the direction of travel of the containers.

4. An apparatus according to claim 1 wherein the containers are open containers filled to capacity with a product which includes a liquid, and wherein said generally helical cam is capable of changing the spacing of the containers between 140 mm. and 280 mm. within a distance of approximately 150 mm. when the containers are traveling at the rate of 250 containers per minute without any spillage.

5. An apparatus according to claim 4 wherein said generally helical cam accelerates the containers from the first conveyor to said second conveyor.

* * * * *